UNITED STATES PATENT OFFICE 2,003,275

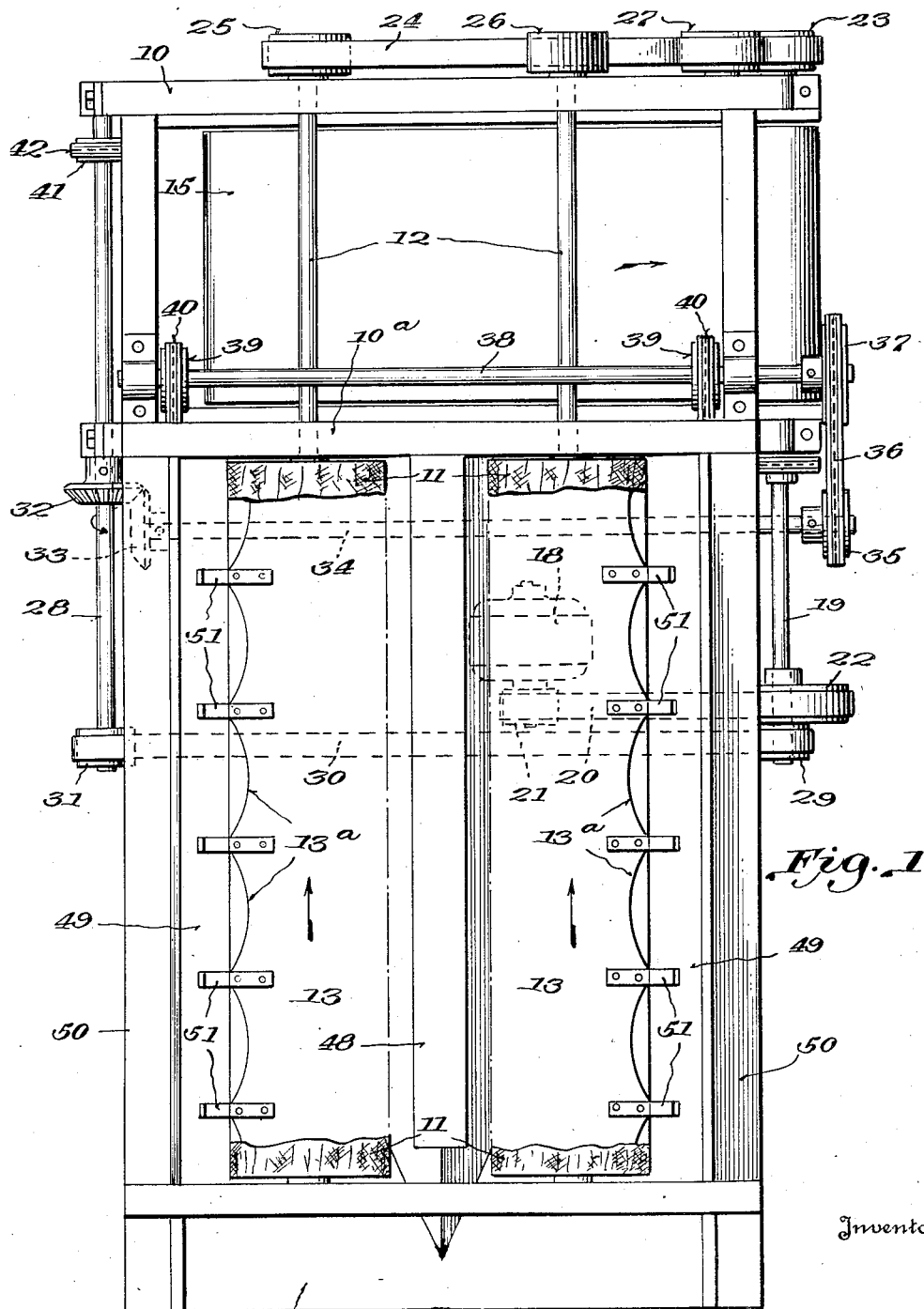

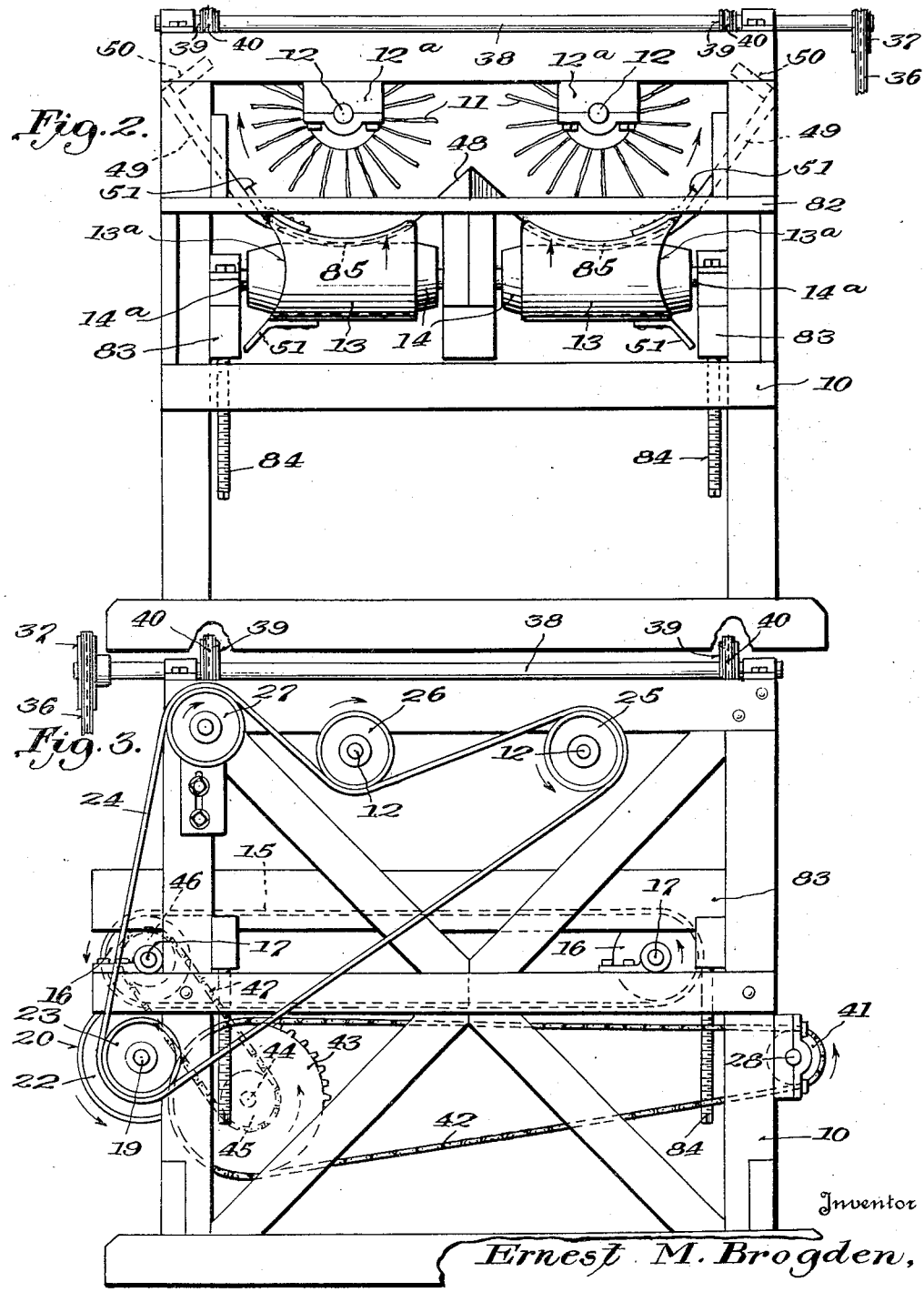

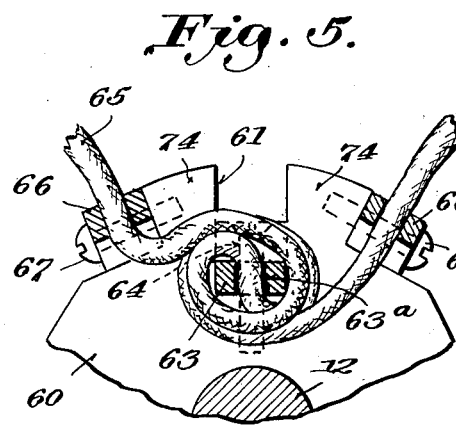
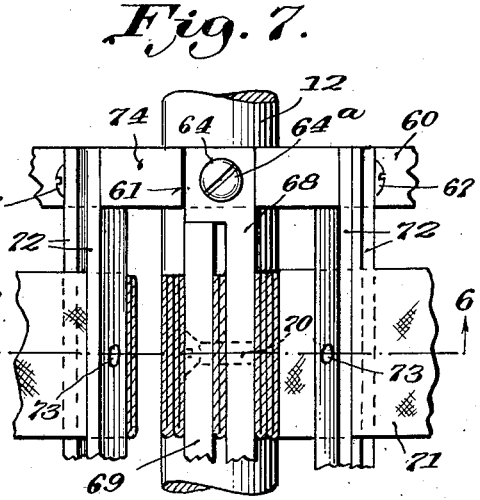
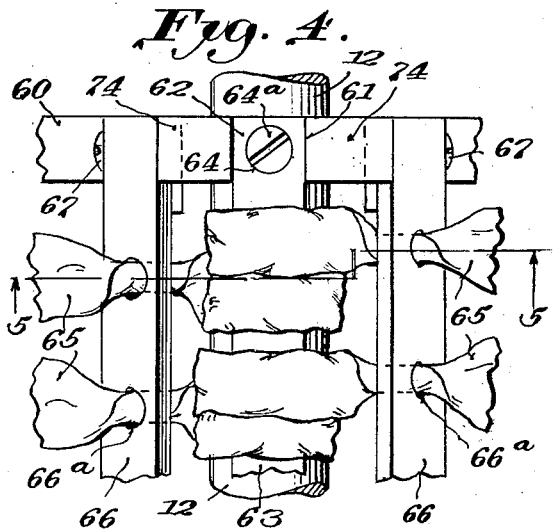
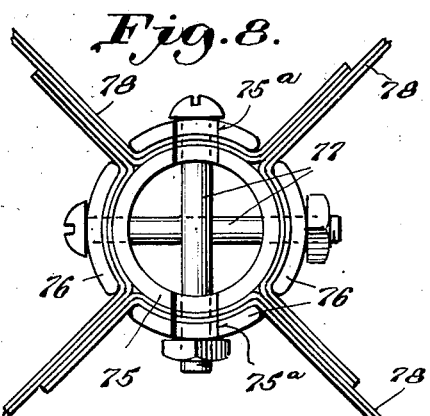
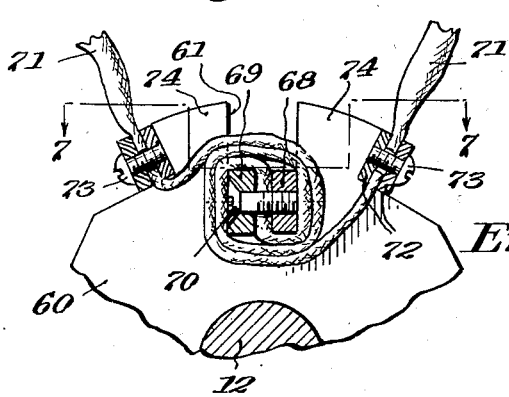
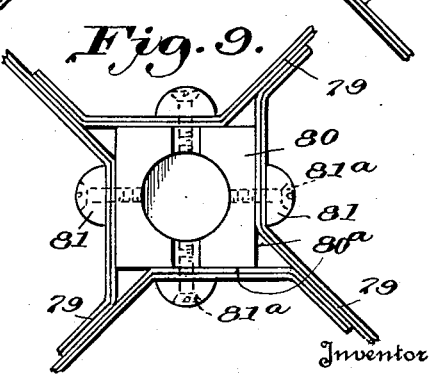

METHOD OF AND APPARATUS FOR TREATING FRUIT AND OTHER ARTICLES

Ernest M. Brogden, Pomona, Calif., assignor to Brogdex Company, Winter Haven, Fla., a corporation of Florida Application September 2, 1931, Serial No. 560,816

11 Claims. (Cl. 146—193)

This invention relates to methods of and apparatus for treating fruit and other articles for the purpose of polishing their outer surfaces.

Proper preparation of fresh fruit for market requires such treatment as will retain the fruit in sound, plump condition and also in attractive appearance, until it is marketed. Sound condition of fruit, such as oranges, is frequently ensured by applying certain mold-inhibiting agents, like borax. To maintain plumpness it has been customary to give fruit, especially citrus fruits, such as oranges, a coating of paraffin wax or the like to reduce withering and shrinkage. Although this coating is very thin it tends to give the fruit a dull, lifeless appearance, which, while not detracting from the intrinsic quality of the furit, very materially lowers the price at which it may be sold.

The principal object of the present invention is to provide a method and apparatus by which fruit, such as oranges, and other articles may be given a permanent high polish or shine.

While the method and apparatus forming the subject-matter of this invention have been developed more particularly for the treatment of paraffined citrus fruits, such method and/or apparatus are adapted for polishing not only unparaffined citrus fruits, but also other fruits, such as apples, whether paraffined or not, as well as a variety of other articles, not included within the term fruit even in its broadest sense.

For the sake of a concrete example whereby the principles of the invention may be illustrated and explained, reference will be made hereinafter more particularly with reference to the treatment of citrus fruit, especially oranges which have been coated with a thin film of paraffin wax.

Unparaffined fruit is readily polished but after a few days the fruit shrinks and withers and the polish disappears in proportion to the shrinkage. Paraffined fruit is much more difficult to shine, but once a shine has been produced it is relatively permanent as the tendency to shrink has been largely eliminated.

In attempting to polish paraffined fruit it was found that a relatively slow moving brush surface has little effect and that it was desirable to use polishing elements of the buffing wheel type in which polishing is accomplished by means of a plurality of limp members extended radially outwards under the centrifugal force produced by the rotation of such wheel. Obviously where stiffness is not inherent in the material used, as in the case of brush bristles, but has to be obtained by centrifugal force, high rotative speeds are necessary. High speed buffing wheels or cylinders, however, have a tendency to seize or hit the fruit so hard that it is knocked about and, in some cases, driven out of the machine. This is especially the case where the fruit is of varying size so that the buffer has to be set low to polish the small fruit with the result that it tends to hit the large fruit unduly hard. Moreover, rough skinned fruit like oranges is much more apt to be thrown out of the machine than a smooth, slick-skinned fruit, such as an apple.

I have found that satisfactory results are obtained by using gravity to press the fruit against the buffers and to automatically regulate the extent to which the buffers contact therewith so that all the fruit, irrespective of size, will receive the proper amount of buffing or rubbing. This may conveniently be accomplished by providing a fruit supporting surface beneath the buffer and upwardly sloping around one side thereof, the radial space between the periphery of the buffer and the supporting surface increasing from an amount less than the diameter of the smallest fruit to be polished to an amount greater than the diameter of the largest fruit. The direction of rotation of the buffer is from the point of minimum radial space to the point of maximum radial space, so that gravity causes the fruit pushed upwardly over said surface by the buffer to return for further contact and polishing action thereby. The smaller the fruit, the further it will move under the buffer before engagement therewith and hence when there are a plurality of rows of fruit in the apparatus and it is usually desirable to have 2, 3 or even 4 of such rows, there is a sorting or classification of the fruit according to size.

In addition to controlling the movement of the fruit to and from the buffer, two other movements are provided for; first, movement of the fruit from one end of the buffer to the other, and, second, a turning or rotary movement of the fruit in every conceivable direction so as to cause each part of the surface thereof to contact with the buffer.

Longitudinal movement of the fruit through the machine may be brought about by inclining the buffer and its cooperating fruit supporting surface in the direction it is desired that the fruit should move. It is advantageous, however, to employ more positive means of advancing the fruit, such as a conveyor belt of canvas or the like, which forms the lower part of the fruit supporting surface. As some of the fruit, especially the larger sizes, may be off the conveyor for all or a large part of the time, due to the throwing action of the buffer, means are provided for engaging and positively advancing such fruit and in the example illustrated, such means comprise fingers extending laterally from one side of the conveyor to sweep along the lower part of the stationary portion of the fruit supporting surface. While there is considerable turning movement produced by the combined action of the buffer and conveyor, with the aid of the fingers on the latter, I find that this turning or irregular rotary movement is much enhanced if the edge of the conveyor on the finger side is scalloped. In fact, when using such a scalloped-edged conveyor there is sufficiently positive contact with the fruit to render the use of the above described lateral fingers unnecessary.

Cloth buffing wheels wear rapidly and while their life may be increased to a considerable extent by the use of special cloths, such as that known in the trade as Piquot sheeting, the wear soon reduces the effective diameter of the buffers. A further object of my invention, therefore, is to provide means for compensating for this wear. In making such compensation, it is desirable that the distance between the ends of the cloth strips and the supporting means therefor on the buffer cylinder should not be decreased since that distance has an important bearing on the resistance of the buffer, and the strength of the blows given the fruit thereby. Various means may be used for this purpose although the one I prefer consists of a buffing wheel provided with a series of bars around each of which the center or one end of each of a plurality of cloth strips is wound. As wear occurs these bars are given a quarter or half turn thereby unwinding or releasing say ½ inch to 1 inch of each of the strips.

In carrying out the polishing of fruit by my invention various forms of apparatus may be employed. Certain forms which have given satisfactory results are shown, by way of example, in the accompanying drawings wherein:—

Figure 1 is a plan view of an apparatus embodying the principles of the present invention.

Figure 2 is an end view showing the receiving end of the same.

Figure 3 is an end view showing the delivery end of the same.

Figure 4 is a plan view of a part of one end of one form of buffer construction.

Figure 5 is a section on the line 5—5 of Figure 4.

Figure 6 is a detail fragmentary sectional view on the line 6—6 of Figure 7, showing a further form of buffer construction.

Figure 7 is a fragmentary sectional view on the line 7—7 of Figure 6.

Figures 8 and 9 are end views of still further forms of buffer construction.

In the drawings only the polishing apparatus is shown since the apparatus by which the fruit may be treated prior to polishing with mold-inhibiting agents and paraffin or the like to retard withering, form no part of the present invention.

As shown, the fruit polishing apparatus comprises a frame 10, supporting, in the example illustrated, a pair of buffer cylinders 11 mounted on shafts 12 journalled in bearings 12ª secured to said frame. Beneath each of these buffer cylinders is a canvas conveyor belt 13, carried at its ends by pulleys 14, mounted on shafts 14ª, each pulley being preferably mounted on a separate shaft to permit independent longitudinal adjustment of belts 13. Only one set of pulleys 14 and their supporting shafts 14ª can be seen (Fig. 2) the other set being hidden from view (Fig. 1) under cross piece 10ª and the inner ends of buffer cylinders 11.

Fruit is delivered to these two conveyor belts over an inclined board, chute, or conveyor (not shown) adapted to rest on cross-piece 82 and is discharged from such belts onto a conveyor belt 15 arranged transversely across the ends of the belts 13. This conveyor belt 15 is supported by pulleys 16 mounted on shafts 17, as shown in Figure 3.

The buffer shafts and the conveyors 13 and 15 are driven from a motor 18, which drives a countershaft 19 by a belt 20 and pulleys 21 and 22. At the discharge end of the apparatus, this countershaft is provided with a pulley 23 which drives a belt 24 passing over a pulley 25 on one buffer shaft, under a pulley 26 on the other buffer shaft, and around a vertically adjustable idler pulley 27, which holds the belt in engagement with the pulley 26. (See Figs. 1 and 3.) As belt 24 passes over pulley 25 and under pulley 26 the buffer shafts are rotated in opposite directions.

The two longitudinal conveyors 13 and the transverse conveyor 15 are driven from a second countershaft 28, connected to the first countershaft 19 by pulley 29, belt 30 and pulley 31. (See Fig. 1.) On this second countershaft is a bevel gear 32, in mesh with a bevel gear 33 on one end of a cross-shaft 34, the latter carrying at its opposite end a sprocket wheel 35. This sprocket is connected by a chain 36 to a sprocket 37, mounted on one end of an overhead cross-shaft 38. The latter shaft in turn drives two shafts 14ª, which carry the pair of pulleys 14, supporting the inner ends of the longitudinal conveyors 13, by sprockets 39, chains 40 and sprockets on shafts 14ª, not shown.

The transverse discharge conveyor belt 15 is driven from the second countershaft 28 by means of a sprocket 41 thereon, connected by a chain 42 to a sprocket 43 on a third countershaft 44. (Fig. 3.) The latter by sprockets 45, 46 and chain 47, drives one of the shafts 17 and the pulleys 16 which support the transverse conveyor belt 15.

The direction of rotation of the various pulleys and sprockets is shown by arrows, as is also the direction of movement of the conveyor belts. The conveyor belts 13 and 15 are preferably mounted on an auxiliary frame 83 carried by and vertically adjustable with respect to the main frame 10 of the apparatus by means of adjusting screws or similar adjusting means 84. The buffers are mounted on the main frame 10 so that by adjusting the position of the auxiliary frame 83, the distance between the buffers and the conveyors 13 may be varied as desired, and thus the apparatus can be adjusted to take care of fruit of different sizes and to compensate for wear or shortening of the polishing cloths. The driving mechanism for the conveyor belts is so arranged that the auxiliary frame may be adjusted without adjusting such driving mechanism.

As previously pointed out, one of the features of the invention is the provision of a fruit supporting surface or runway beneath each buffer and upwardly sloping around one side thereof, the radial space between the periphery of the buffer and the supporting surface increasing from an amount less than the diameter of the smallest fruit to be polished to an amount greater than the diameter of the largest fruit. As shown in Figs. 1 and 2, the bottom portion of each fruit supporting surface or runway is formed by one of the conveyor belts 13, the upper run or flight of which is supported in a trough-shaped or curved runway 85 (see Fig. 2) which is curved on an arc of larger radius than, but concentric with, the circumference of the cooperating buffer, the upper run of each conveyor taking the same curved cross-section as its supporting runway.

The buffers are arranged to turn so as to throw the fruit toward the sides of the apparatus and hence the outside portion of each runway is formed as an inclined plane surface or board 49 which slopes upwardly and outwardly away from the buffing cylinder so that fruit may roll up this inclined surface or board under the action of the buffing cylinder. To prevent such fruit from rolling over the upper edge, board 49 is provided with an inwardly projecting guard 50. A division board or guard 48 separates the two runways and prevents fruit from getting out on that side. This arrangement of supporting the fruit not only automatically regulates the extent to which the buffers contact with said fruit, irrespective of size, but the tendency of the high speed buffers to force the fruit off the belts and up the sides of the inclines causes a constant turning of the fruit with the result that all surfaces thereof are thoroughly buffed or rubbed. This turning movement of the fruit is also aided by pusher fingers 51 secured to the outer marginal portions or edges of the belts 13. These pusher fingers, which are made of leather or other flexible material, extend laterally from belts 13 so that they travel along the lower portions of boards 49 and engage and push fruit along said boards. The outer marginal edges of belts 13 are also provided with curved cut-out portions or scallops 13ᵃ, as shown in Fig. 1, to further enhance the turning movement of the fruit as it goes through the apparatus. The features just described cooperate to keep the fruit constantly turning and mixing around during its entire travel through the apparatus so that when it has reached the end of its travel every spot on its surface has been thoroughly buffed or rubbed.

As previously pointed out, the successful operation of the machine depends largely on maintaining proper spacing between the periphery of the rotating buffers and the conveyors 13 and inclined boards 49. This involves compensating for the reduction in the diameter of the buffers, due to wear. Raising the auxiliary frame 83, carrying the fruit supporting conveyors 13 and the inclined boards 49, up toward the buffers, as previously described, compensates for a certain amount of wear, but after the diameter of the buffer has been reduced to a certain point, the efficiency of the apparatus is impaired. Accordingly, means have been provided for maintaining a substantially uniform diameter for the buffers, in spite of wear occasioned by use.

One of the most suitable types of buffer for the present purpose is that in which the polishing is accomplished by means of a plurality of limp members extended radially outwards under the centrifugal force produced by the rotation of such buffing element. As already pointed out the limp members, usually cloth, wear rapidly at the ends and therefore means for compensating for such wear have been provided. This may be accomplished in various ways and four suitable forms of buffer construction are shown in Figs. 4 to 9. In each case the buffing cloths or the like may be extended outwards so that the effective diameter of the rotating buffer may be maintained more or less constant.

Perhaps the most convenient and universally satisfactory of the forms illustrated is that shown in Figures 4 and 5. In this case a plate or spider 60 is mounted on each end of the buffer shaft 12 and secured thereto by a set screw or the like, said plate being formed with a plurality, conveniently three, slots 61 for the reception of the squared ends 62 of steel bars 63. These bars have a series of apertures 63ᵃ therealong through which strips 65 of buffing cloth or other buffing medium are passed, as shown in Figure 5. The buffing medium is preferably made of a good grade of sheeting, what is known in the trade as "Piquot" sheeting having been found very satisfactory in practice, but any suitable buffing medium such as canvas, strings, heavy cords, fine wires, etc. may be used. Bars 63 are provided adjacent their ends with holes 64 through which screws 64ᵃ are passed to clamp the ends of the bars in the slots 61 of the plates or spiders 60.

The ends of each of the buffing strips 65 are passed through apertures 66ᵃ in a pair of steel guides 66, attached by screws 67 to lugs 74 on the plate 60 on each side of the slot 61. The apertures in these guides are staggered so as to distribute the ends of the buffing strips substantially uniformly along the buffers. When the buffing cylinder is rotated the free ends of the buffing strips extending beyond the guides 66 are thrown radially outwards by centrifugal force. The polishing is accomplished largely by the tips of these strips so that the latter wear away with use. For satisfactory operation the effective diameter of the buffing cylinder as a whole should not vary greatly. Hence, when the tips of the cloths wear down the cloths must either be replaced or moved outwards through the guides 66 to compensate for such wear. The most convenient method is to use long buffing cloth strips and wind the center portion around the bar 63 until the ends project only the desired distance from the guides 66. Then, as the tips of the cloths wear down, the center portion is unwound to compensate for such wear. To turn the bar 63 to unwind the buffing cloths, all that is necessary is to remove the screws 64ᵃ, lift the bar 63 clear of the slots 61, give it a quarter, half, or other desired turn, then drop it back into the slots and replace the screws.

The form of construction shown in Figs. 6 and 7 is very similar to that just described. In this case, however, the bar 68, which corresponds to the bar 63 of Figs. 4 and 5, is not apertured but is cut away between its ends and a clamping bar 69 is secured thereto by screws 70, thereby gripping the strips 71 of buffing cloth placed therebetween. Similarly the guides are formed of pairs of steel strips 72 clamped together by screws 73 to hold the cloth passed therebetween in adjusted position.

In the two forms of construction just described both ends of the fabric are used for buffing purposes and adjustment for wear is provided by unwinding the center part of the cloth strips. A different method of adjustment is used in the modifications shown in Figs. 8 and 9. Here, only one end of the cloth strips are used for buffing purposes, the other end being used merely as reserve material to allow the end used for buffing to be extended to compensate for wear. In Fig. 8, 75 indicates a metal tube against the outer face of which metal strips 76, most advantageously of arcuate or curved cross-section, are clamped by bolts 77. Tube 75 is adapted to be supported and driven by stub shafts (not shown) which extend into the ends thereof for a short distance. One or both ends of the tube 75 are provided with a slot or keyway 75ª to receive a key or keys carried by one or both of the steel shafts. One of the stub shafts may be slidably mounted in its bearing to permit the tube 75 to be easily mounted thereon. The cloth buffing strips 78 pass between the tube 75 and the metal strips 76 and are securely held in place thereby. When the buffing strips are worn down the bolts 77 are loosened, the buffing strips pulled out to the desired extent and the bolts tightened once more.

The same general underlying principles are used in the modification shown in Fig. 9. In this case, however, a bar or tube 80 having plane surfaces or faces 80ª is used in place of a round tube and the cloth buffing strips 79 are clamped thereto by clamping strips or cleats 81 held in place by screws or similar fastening means 81ª. If desired, the faces 80ª can be provided wtih grooves (not shown) to receive the clamping strips 81. If desired, the buffing cloths or strips 79 could be wound around the strips 81, as in Figs. 4–7, so that both ends could be used for buffing, instead of only one, as shown.

The cloths or other buffing medium may be treated to reduce wear as, for example, by dipping them into a 1% solution of rubber in benzol.

The apparatus above described is adapted for polishing or rubbing fruit of all kinds, as well as other articles so long as such articles are of a generally spherical character. For example, the apparatus may be used for removing the fuzz from peaches, cleaning and shining walnuts, etc. In the latter case a fine wire cloth may be used in place of the Piquot sheeting employed for polishing oranges and similar fruit.

While the apparatus thus has a wide range of utility, the character of the articles treated should be taken into account in its operation. Oranges have a rough skin and hence require high buffer speeds and longer time of treatment than smooth, slick skinned fruit, like apples. Thus it has been found that for oranges a suitable buffer speed, for an 11 inch diameter buffer, is around 700–750 R. P. M., with an average treatment time of about 12 or 13 seconds, using a buffer about 6 feet long. With apples, around 500 R. P. M., with about 6 seconds treatment time has been found satisfactory. These times and speeds of rotation, which are given merely by way of example, may be varied in practice, and it is to be understood that the invention is not limited to the particular details given.

Similarly, the size of the apparatus and the distance between the buffers and the conveyors may vary. For the ordinary run of oranges it has been found that excellent results are obtained with the conveyor belts about 1¼ inches below the ends of the buffing cloths.

It will also be understood that numerous changes may be made in the design of the apparatus without departing from the principles of the invention. Thus the passage of the fruit or the like through the machine may be brought about by gravity instead of by conveyors, the buffers and fruit supporting surfaces being inclined downwardly in the direction of movement desired in order to produce this result. A two-runway apparatus has been illustrated and described, but obviously one or more runways may be used.

What is claimed is:

1. A machine for polishing fruit and the like comprising a substantially horizontal elongated rotary polishing element having a plurality of limp members along its length adapted to extend radially outward under the centrifugal force produced by the rotation of said element to form the polishing face of said element, a brushless fruit-supporting surface having a portion beneath and extending axially of said element and transversely curved on an arc concentric with said element and another portion upwardly and outwardly inclined on the upward-run side of said polishing element, one of said surface portions being fixed and the other movable in a direction feeding fruit axially of said polishing element and both of said surface portions cooperating to provide a fruit runway having an unobstructed space between the polishing face of said element and said surface of radial extent increasing upwardly of said runway whereby fruit impacted by said polishing element is free to move upwardly over said surface under the force of said impact and returns by gravity downwardly over said surface for further contact with said polishing element and polishing action thereby.

2. A machine for polishing fruit and the like as defined in claim 1 and in which that portion of the fruit-supporting surface which lies beneath the polishing element comprises an endless conveyor traveling in a direction parallel to the axis of the polishing element.

3. A machine for polishing fruit and the like comprising a substantially horizontal elongated rotary polishing element, fruit-feeding means presenting two side-by-side fruit-supporting surfaces extending axially of said polishing element and having such transverse surface contour and being so disposed beneath and on the upward-run side of said element as to form a fruit runway having a spacing of the fruit-supporting surfaces from the periphery of said element increasing upwardly of said runway on the upward-run side of said element, one of said surfaces being arranged to move axially of said element in the operation of said fruit feeding means and the other being fixed, and said moving surface having a scalloped side edge adjoining said fixed surface and formed to be engaged by fruit when rolling from said fixed surface onto said moving surface and thereby to vary the turning movements of said fruit.

4. A machine for polishing fruit and the like comprising a rotary polishing element, a fruit-supporting surface operatively adjacent said element for feeding fruit axially of said element, said fruit-supporting surface comprising a fixed portion and a portion movable in a direction parallel to the axis of said polishing element and fingers secured to said movable portion and extending over said fixed portion.

5. A machine for polishing fruit and the like comprising a substantially horizontal elongated rotary polishing element, fruit-feeding means presenting two side-by-side fruit-supporting surfaces extending axially of said polishing element and having such transverse surface contour and being so disposed beneath and on one side of said element as to form a fruit runway having a spacing of the fruit-supporting surfaces from the periphery of said element increasing upwardly of said runway on the upward-run side of said element, one of said surfaces being arranged to move axially of said element in the operation of said fruit feeding means and the other being fixed, and fingers secured to said moving surface and extending laterally therefrom over said fixed surface.

6. A machine of polishing fruit or the like comprising a substantially horizontal elongated rotary polishing element having limp polishing members adapted to extend radially outwards under the centrifugal force produced by the rotation of said element to form the polishing face of said element, an endless fruit conveyor of canvas or the like disposed axially of and beneath said polishing element and having a transverse contour complementary to the transverse contour of the polishing face of said polishing element, and a fixed fruit-supporting surface laterally adjacent said conveyor and upwardly and outwardly inclined therefrom on the upward-run of said polisher element to form with said conveyor a runway for fruit.

7. A machine for polishing fruit and the like as defined in claim 6, and in which said conveyor is provided with fingers secured thereto and extending laterally therefrom over said fixed fruit-supporting surface.

8. A machine for polishing fruit and the like as defined in claim 6 and in which said conveyor is provided with a scalloped edge on the side adjoining said fixed fruit-supporting surface and formed to be engaged by fruit when rolling from said fixed surface onto said conveyor and thereby to vary the turning movements of said fruit.

9. A machine for polishing fruit and the like comprising a rotary polishing element having its axis of rotation nearer to the horizontal than the vertical, a traveling fruit conveyor disposed beneath and moving axially of said polishing element, presenting a brushless fruit-supporting surface having a transverse curvature complementary to the opposed face of said element and a longitudinal side edge on the upward-run side of said polishing element substantially below the crown of said element, and a fixed structural element presenting a stationary and brushless fruit-engaging surface on the upward-run side of said polishing element immediately adjacent and extending along said side edge of said conveyor and inclined in the transverse direction at an oblique angle to the vertical upwardly from said conveyor and away from said polishing element so as to form with said conveyor an unobstructed fruit runway beneath and to one side of said polishing element increasing in width upwardly of said runway, whereby fruit impacted by said polishing element is free to move upwardly over said surfaces of said runway under the force of said impact and returns by gravity downwardly over said surfaces for further contact with said polishing element and polishing action thereby.

10. A machine for polishing fruit and the like as defined in claim 9 and in which the polishing face of said polishing element is of cylindrical contour, the transverse curvature of said conveyor is on an arc of a circle having its center in the axis of said polishing element, and said stationary fruit-engaging surface is a plane surface.

11. A machine for polishing fruit and the like as defined in claim 9 and further characterized by said side edge of said conveyor having segmental cut-outs to form a scalloped edge adapted to be engaged by fruit rolling from said stationary surface onto said conveyor and thereby to vary the turning movements of said fruit.

ERNEST M. BROGDEN.